United States Patent
O'Gorman et al.

(10) Patent No.: US 8,121,811 B2
(45) Date of Patent: Feb. 21, 2012

(54) SYSTEMS AND METHODS FOR DETECTING ANGULAR POSITION

(75) Inventors: Patrick A. O'Gorman, Grayslake, IL (US); Rene Vivanco, Peachtree City, GA (US); Alex Kurnia, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 343 days.

(21) Appl. No.: 12/061,639

(22) Filed: Apr. 2, 2008

(65) Prior Publication Data
US 2009/0254301 A1    Oct. 8, 2009

(51) Int. Cl.
G01C 9/00    (2006.01)
(52) U.S. Cl. ...................................................... 702/151
(58) Field of Classification Search .................... 702/151
See application file for complete search history.

(56) References Cited

U.S. PATENT DOCUMENTS

| | | |
|---|---|---|
| 4,285,240 A | 8/1981 | Gold |
| 4,295,085 A | 10/1981 | Lafuze |
| 4,786,891 A | 11/1988 | Ueda et al. |
| 4,978,895 A | 12/1990 | Schwarz |
| 4,992,716 A | 2/1991 | Ellis |
| 5,140,245 A | 8/1992 | Stacey |
| 5,461,293 A | 10/1995 | Rozman et al. |
| 5,495,163 A | 2/1996 | Rozman et al. |
| 6,747,834 B1 | 6/2004 | Matsuyama |
| 6,772,101 B1 | 8/2004 | Tanaka et al. |
| 6,826,499 B2 * | 11/2004 | Colosky et al. ................. 702/85 |
| 2002/0024336 A1 * | 2/2002 | Desbiolles et al. ...... 324/207.25 |

OTHER PUBLICATIONS

Initial Rotor Position Estimation Method for PM Motors; Marco Tursini, Member, IEEE Roberto Petrella, Member, IEEE, and Francesco Parasiliti; IEEE Transactions on Industry Applications, vol. 39, No. 6, Nov./Dec. 2003.
New Initial Position Detection Technique for Three-Phase Brushless DC Motor Without Position and Current Sensors, Yen-Shin Lai, Senior Member, IEEE, Fu-San Shyu, and Shian Shau Tseng; IEEE Transactions on Industry Applications, vol. 39, No. 2, Mar./Apr. 2003.
The Next Generation of Position Sensing parts I and II, Mar. 2001, Sensors; Asad M. Madni, Jim B. Vuong, and Roger F. Wells, BEI Technologies, Inc. http://archives.sensorsmag.com/articles.
Angular Position Sensing with 2-Axis Hall IC 2SA-10, AN-101 Sentron, Lou Law, Magnetic Sensors, Feb. 12, 2004, 7 pages.
Delphi Non-Contact Rotary Position Sensor, www.delphi.com, 2008 Delphi Corporation.
Lessons in Electric Circuits—vol. II, Tony R. Kuphaldt, www.ibiblio.org/kuphaldt/electriccircuits; 72 pages.

* cited by examiner

Primary Examiner — Aditya Bhat

(57) ABSTRACT

Methods and systems for detecting an angular position of a rotating device are disclosed, including sensing and counting high-resolution transitions of a high-resolution digital sensor in response to the rotating device rotating; sensing low-resolution transitions of a low-resolution digital sensor in response to the rotating device rotating, the low-resolutions transitions being spaced apart at uneven angles; determining an angular position of the rotating device in response to determining a number of high-resolution transitions between pairs of low-resolution transitions.

21 Claims, 5 Drawing Sheets

SYSTEMS AND METHODS FOR DETECTING ANGULAR POSITION

I. BACKGROUND

The invention relates generally to the field of detecting angular positions of a rotating device.

II. SUMMARY

In one respect, disclosed is a method for detecting angular position of a rotating device, the method comprising: sensing and counting high-resolution transitions of a high-resolution digital sensor in response to the rotating device rotating; sensing low-resolution transitions of a low-resolution digital sensor in response to the rotating device rotating, the low-resolutions transitions being spaced apart at uneven angles; determining an angular position of the rotating device in response to determining a number of high-resolution transitions between pairs of low-resolution transitions.

In another respect, disclosed is a system for detecting an angular position of a rotating device, the system comprising: a high-resolution digital sensor positioned such that the high-resolution digital sensor senses rotation of the rotating device; a low-resolution digital sensor positioned such that the low-resolution digital sensor senses rotation of the rotating device; a control circuit electrically coupled to the digital sensor; the control circuit being configured to: receive and count high-resolution transitions from the high-resolution digital sensor in response to the rotating device rotating; receive low-resolution transitions from the low-resolution digital sensor in response to the rotating device rotating, the low-resolution transitions being spaced apart at uneven angles; determine an angular position of the rotating device in response to determining a number of high-resolution transitions between pairs of low-resolution transitions.

In yet another respect, disclosed is an electric motor comprising: a rotor configured to produce a magnetic field; one or more stator coils rotatively coupled to the rotor; a high-resolution digital sensor positioned such that the high-resolution digital sensor senses rotation of the rotating device; a low-resolution digital sensor positioned such that the low-resolution digital sensor senses rotation of the rotating device; a control circuit electrically coupled to the digital sensor; the control circuit being configured to: receive and count high-resolution transitions from the high-resolution digital sensor in response to the electric motor rotating; receive low-resolution transitions from the low-resolution digital sensor in response to the electric motor rotating, the low-resolution transitions being spaced apart at uneven angles; determine an angular position of the rotating device in response to determining a number of high-resolution transitions between pairs of low-resolution transitions.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
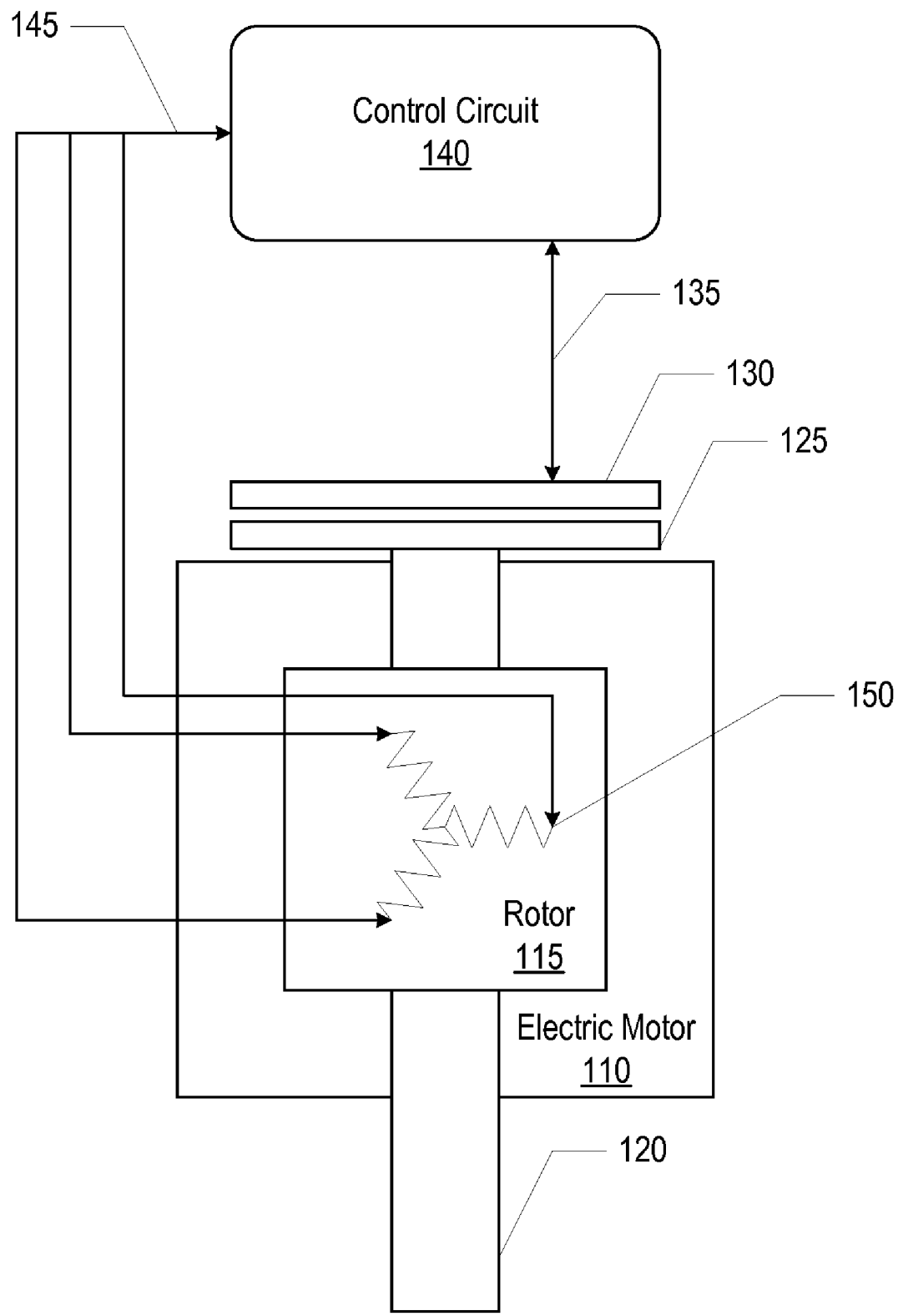
FIG. 1 is a block diagram illustrating a system for detecting an angular position of a rotating device, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, the angular position of a rotating device is to be determined. In some embodiments, one or more high resolution transitions of a high-resolution digital sensor are sensed and counted in response to the rotating device rotating. Similarly, low-resolution transitions of a low-resolution digital sensor are sensed in response to the rotating device rotating, the low-resolutions transitions being spaced apart at uneven angles.

In some embodiments, the angular position of the rotor may be determined by counting the number of high-resolution transitions between the low-resolution transitions. Since the low resolution transitions are spaced apart at uneven angles, an angular position of the rotating device may be identified by counting and distinguishing the high resolution transition between pairs of low resolution transitions.

In some embodiments, a direction of rotation may also be determined by comparing successive numbers of high resolution transitions between successive pairs of low resolution transitions. The sequence of the numbers of high-resolution transitions may then indicate the direction of rotation.

In some embodiments, an additional high-resolution digital sensor may be used. In some embodiments, the digital sensor and the additional digital sensor may be in quadrature with each other. A direction of rotation of the rotating device may be determined by comparing the low resolution transitions to the high resolution transitions and the other high resolution transitions.

In some embodiments, the rotating device may be an electric motor comprising stator coils and one or more rotors. In some embodiments, the electric motor may be a three-phase AC electric motor comprising three or more stator coils. The rotor of the electric motor may be a single pair north-south power magnet. The rotor may also consist of additional power magnet pairs. In such embodiments, each mechanical revolution of the electric motor may correspond to multiple effective electrical revolutions depending on the pairs of power magnets used. Electromagnets using coils may also be used in place of the power magnets.

In some embodiments, an approximate angular position of the electric motor may be determined by sending an electric pulse through one or more of the stator coils of the electric motor. The timing of the returning pulse, among other factors, is affected by the current position of the rotor (power magnet, in some embodiments) of the electric motor though the interaction of the magnetic flux from the rotor and the magnetic flux generated by the pulse travelling through the one or more stator coils. Thus, an approximate position of the rotor may be determined in response to detecting the timing of a returning electrical pulse from the stator coil.

In some embodiments, the rotating device may be calibrated such that a specific transition of the digital sensor is known to a high degree of accuracy. In such embodiments, once the calibrated transition occurs, the angular position of the rotating device may be determined to a great degree of accuracy.

FIG. 1 is a block diagram illustrating a system for detecting an angular position of a rotating device, in accordance with some embodiments.

In some embodiments, the rotating device may be an electric motor. It should be noted, however, that the methods and systems described herein may be applied to other rotating devices whose angular position is to be determined.

In some embodiments, electric motor 110 is configured to receive electrical power and to convert the electrical power to mechanical energy, which may be transferred to a load through axle 120. The motor may be a three-phase electric motor and may include three stator coils 150 configured to receive AC current through electric lines 145. The changing magnetic field generated by stator coils 150 generates a torque on rotor 115 and axle 120. In some embodiments, rotor 115 may include one or more pairs of north-south power magnets. In other embodiments, rotor 115 may include electromagnets that generate magnetic fields using coils and DC current. In some embodiments, control circuit 140 is configured to generate appropriate currents to supply to stator coils 150 through electrical lines 145. Depending on the rotational speed, direction of the rotational speed, and position of the rotor, currents having an appropriate amplitude and phase must be supplied to the stator coils to generate optimal rotation of the rotor.

Electric motor 110 may also include one or more digital sensors that are coupled to control circuit 140 using electrical line 135. In some embodiments, the digital sensors may include detectors 130 that may be stationary and transition rings 125 containing high and low signal information that may be detected by detectors 130 while transition rings 125 rotate relative to detectors 130.

The digital sensor may be any suitable device that can generate a series of low and high signals while the transition ring rotates in relation to the detector. For example, the digital sensor may be a laser that is either reflected or not by the transition ring; a Hall sensor rotating over north and south magnets, a reluctance sensor, etc.

Figure 2:
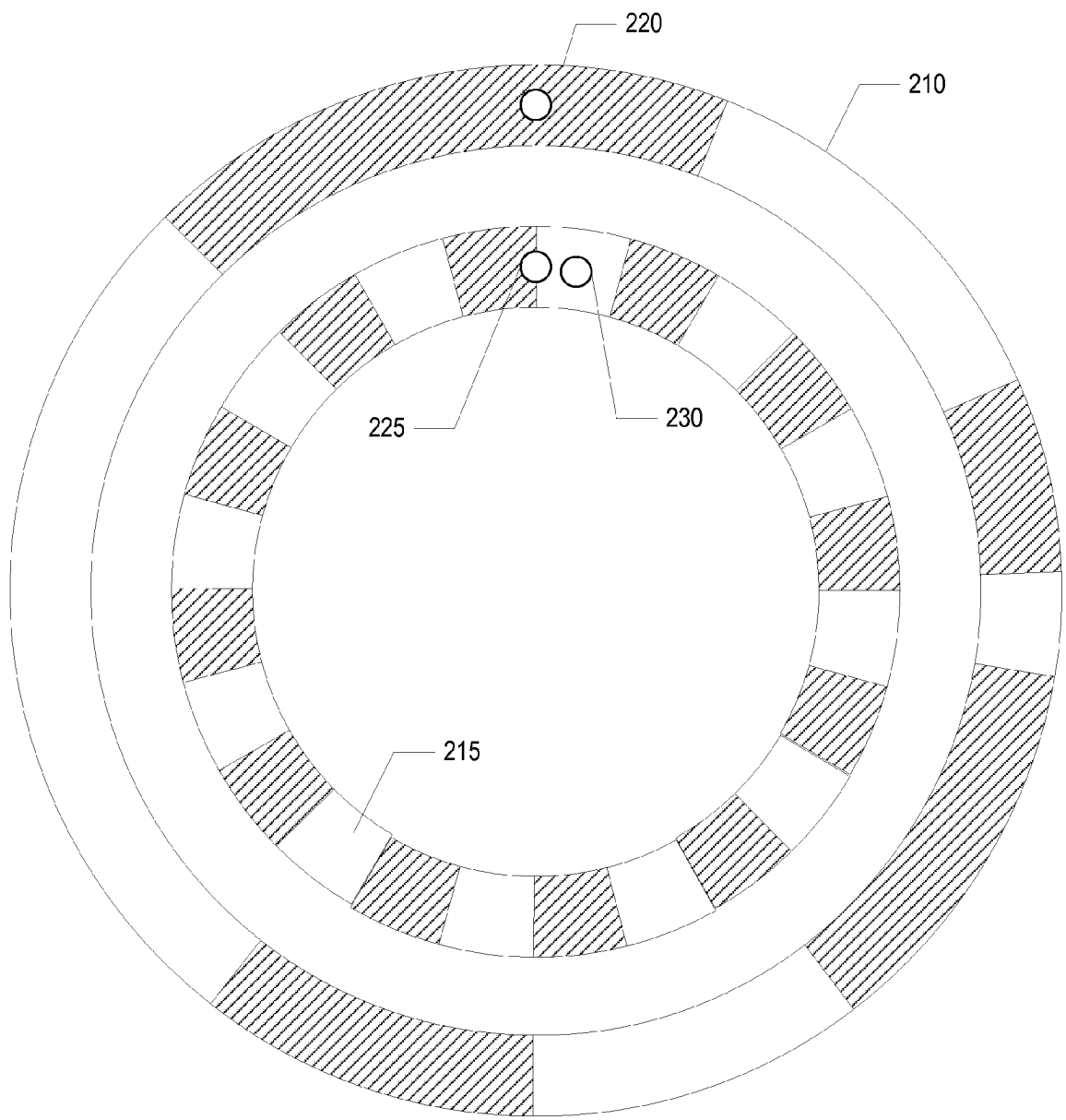
FIG. 2 is a block diagram illustrating digital sensors used in the determination of the angular position of a rotating device, in accordance with some embodiments.

FIG. 2 is a block diagram illustrating digital sensors used in the determination of the angular position of a rotating device, in accordance with some embodiments.

A low resolution digital monitor may include detector 220 and transitions ring 210. In some embodiments, detector 220 may be mounted such that detector 220 rotates relative to transitions ring 220 when the rotating device rotates. For example, transition ring 210 may be connected to the rotating portion of the rotating device, and detector 220 may be mounted to a stationary portion or vice versa.

Any suitable digital sensor may be used that can generate low and high type signals. In some embodiments, a hall sensor may be used as the detector and magnets may be used for the transition rings. A south magnet, for example, may indicate a low value (hashed portion of the ring) and a north magnet may be used to indicate a high value. Other similar digital sensors may be used such a laser light as the detector and reflective/non-reflective surfaces as the transition ring. A reluctance type sensor may also be used.

As can be seen from the figure, transition ring 210 is configured to generate low and high signals at uneven angles. More details of these signals are provided in FIG. 3. The distribution of the signals may be used to determine the angular position of the rotating device as well as the direction of rotation. It should be noted that in some embodiments, only one high resolution signal may be used.

One or two or more high resolution digital sensors may also be used. In some embodiments, detector 225 and 230 may be used in combination with transitions ring 215. The hashed surfaces may indicate the high values of the signal, for example. In some embodiments, the two high-resolution sensors may be in quadrature with each other—90 degrees out-of-phase with each other.

Figure 4:
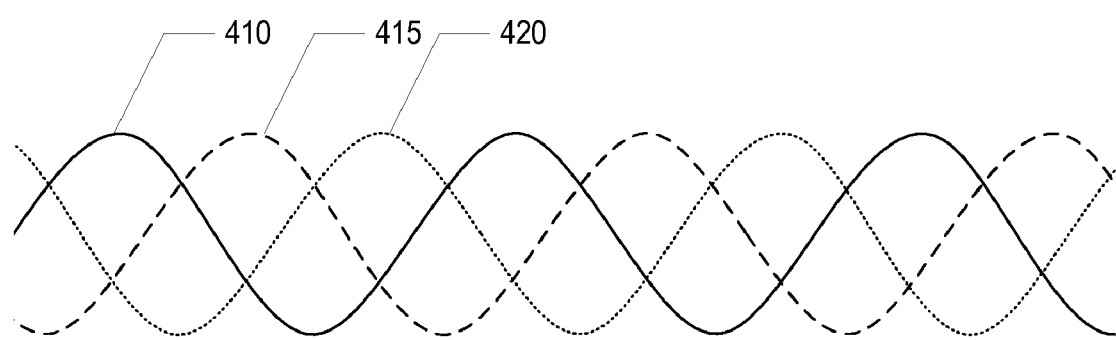
FIG. 4 is a graphical representation illustrating example signals returned from the stator coils of an electric motor indicating a position of the electric motor, in accordance with some embodiments.

Example signals generated by the digital sensors are provided in FIG. 4.

Additional low resolution sensors may be used (not shown here) for increased accuracy and reliability.

Figure 3:
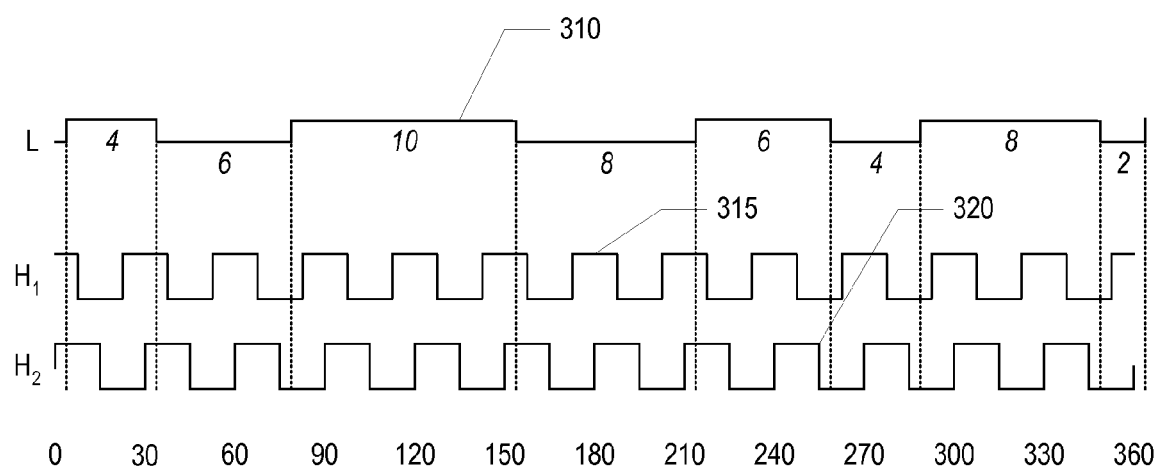
FIG. 3 is a graphical representation illustrating signals received from digital sensors used in the determination of the angular position of rotating device, in accordance with some embodiments.

FIG. 3 is a graphical representation illustrating signals received from digital sensors used in the determination of the angular position of rotating device, in accordance with some embodiments.

As shown in the figure, signal 310 (L) may be generated from detector 220 and transition ring 210, signal 315 ($H_1$) may be generated from detector 230 and transition ring 215, and signal 320 ($H_2$) may be generated using detector 225 and again transition ring 215. In some embodiments, only one high resolution signal may be generated ($H_1$, for example).

An angular position of rotating device may be determined by counting the number of high resolution transitions (H1 and H2) that occur between low resolution transitions (L). For example, if 6 transitions first occurs followed by 12 transitions, then it may be determined that the rotating device is at approximately the transition at 150 degrees. Furthermore, it may be determined that the rotating device is rotating clockwise.

It should be noted that alternative spacing between the low resolution transitions may be used to more efficiently determine angular position.

An angular position of the electric motor may also be determined when a transition in signal 310 occurs and compared to signals 315 and 320. The transitions may be calibrated to correspond to known angular positions. A transition may be identified by examining high resolution signals 315 and 320. For example, if a rising transition is detected in signal 310 and a rising transition is detected in signal 320, the transition corresponds to the angular position at 90 degrees. If on the other hand a falling transition is detected on signal 320, the transition corresponds to the angular position at 270 degrees.

Similarly, the direction of rotation may be determined. In the example above, the first scenario would correspond to a clockwise rotation and the second scenario would correspond to counter-clockwise rotation.

FIG. 4 is a graphical representation illustrating example signals returned from the stator coils of an electric motor indicating a position of the electric motor, in accordance with some embodiments.

In an embodiment where the rotating device is an electric motor, an initial angular position of the electric motor may be determined by sending electrical pulses to stator coils 150 using control circuit 140 (shown in FIG. 1). Shown in this figure are the times the electric pulses return to control circuit 140 for different positions of rotor 115. Graphs 410, 415, and 420 correspond to each of stator coils 150. The timing of the returning pulses from each of the stator coils depends on the angular position of the rotor. In some embodiments, a single pulse from a single stator coil may be used to determine an initial position of the rotor. In other embodiments, for increased accuracy, additional pulses may be sent through the single stator coil and then averaged. For additional accuracy pulses may be sent through one or more additional stator coils (or more multiple averaged pulses). The results from all stator coils may then be compared to determine a more accurate angular position for the rotor.

A more detailed explanation of how to obtain an initial angular position of the electric motor is given in a paper by Marco Tursini, Member, IEEE, Roberto Petrella, Member, IEEE, and Francesco Parasiliti, titled "Initial Rotor Position Estimation Method for PM Motors", IEEE TRANSACTIONS ON INDUSTRY APPLICATIONS, VOL. 39, NO. 6, NOVEMBER/DECEMBER 2003, which is incorporated herein by reference.

Figure 5:
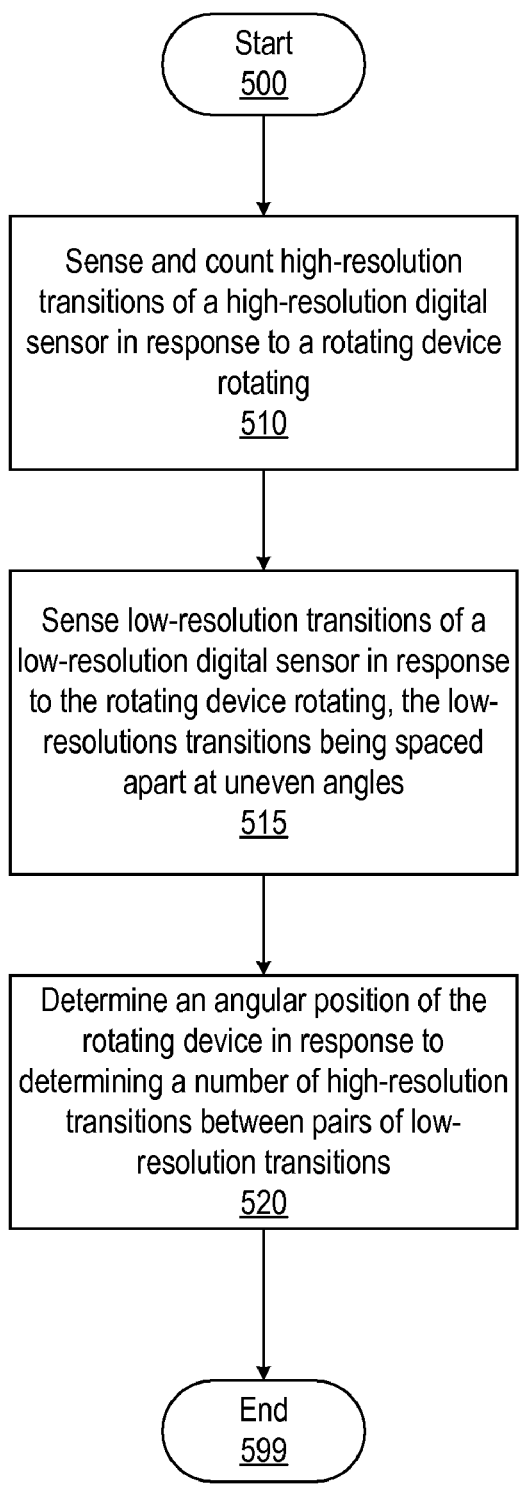
FIG. 5 is a flow diagram illustrating a method for detecting the angular position of a rotating device, in accordance with some embodiments.

FIG. 5 is a flow diagram illustrating a method for detecting the angular position of a rotating device, in accordance with some embodiments.

Processing begins at 500 whereupon, at block 510, high-resolution transitions of a high-resolution digital sensor are sensed and counted in response to a rotating device rotating.

At block 515, low-resolution transitions of a low-resolution digital sensor are sensed in response to the rotating device rotating, the low-resolutions transitions being spaced apart at uneven angles.

At block 520, an angular position of the rotating device is determined in response to determining a number of high-resolution transitions between pairs of low-resolution transitions.

Processing subsequently ends at 599.

FIG. 1 shows an example of a system that may be used to perform the method described here.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for detecting angular position of a rotating device, the method comprising:
   sensing and counting high-resolution transitions of a high-resolution digital sensor in response to the rotating device rotating;
   sensing low-resolution transitions of a low-resolution digital sensor in response to the rotating device rotating, the low-resolutions transitions being unevenly spaced apart;
   determining an angular position of the rotating device in response to determining a number of high-resolution transitions between pairs of low-resolution transitions;
   wherein the rotating device rotates a first amount between a first low-resolution transition and a second low-resolution transition, and the rotating device rotates a second amount, which is different than the first amount, between the second low-resolution transition and a third low-resolution transition, wherein the first, second, and third low-resolution transitions occur consecutively.

2. The method of claim 1, further comprising:
   sensing and counting one or more other high-resolution transitions of another high-resolution digital sensor in response to the rotating device rotating; and
   comparing the low resolution sensor, the high resolution sensor, and the other high resolution sensor to determine a direction of rotation of the device.

3. The method of claim 1, where the high resolution sensor and the other high resolution sensor are in quadrature with each other.

4. The method of claim 1, where the rotating device is an electric motor comprising a rotor and one or more stator coils, the method further comprising:
   sending one or more electrical pulses through one or more of the stator coils of the electric motor; and
   determining an initial approximate angular position of the rotor of the electric motor in response to detecting timings of returning electrical pulses from the one or more stator coils, the timing of the returning electrical pulses being indicative of the angular position of the rotor.

5. The method of claim 4, further comprising determining a very accurate position of the rotor by detecting a pre-calibrated transition, the pre-calibrated transition being one of the transitions, the pre-calibrated transition having been pre-calibrated to the very accurate position.

6. The method of claim 4, where the electric motor comprises additional rotor magnets.

7. The method of claim 1, further comprising determining a direction of rotation in response to determining a number of high-resolution transitions between pairs of low-resolution transitions.

8. A system for detecting an angular position of a rotating device, the system comprising:
   a high-resolution digital sensor positioned such that the high-resolution digital sensor senses rotation of the rotating device;
   a low-resolution digital sensor positioned such that the low-resolution digital sensor senses rotation of the rotating device;
   a control circuit electrically coupled to the digital sensor;
   the control circuit being configured to:
      receive and count high-resolution transitions from the high-resolution digital sensor in response to the rotating device rotating;
      receive low-resolution transitions from the low-resolution digital sensor in response to the rotating device rotating, the low-resolution transitions being unevenly spaced apart;
      determine an angular position of the rotating device in response to determining a number of high-resolution transitions between pairs of low-resolution transitions;
   wherein the rotating device rotates a first amount between a first low-resolution transition and a second low-resolution transition, and the rotating device rotates a second amount, which is different than the first amount, between the second low-resolution transition and a third low-resolution transition, wherein the first, second, and third low-resolution transitions occur consecutively.

9. The system of claim 8, further comprising another high-resolution sensor, the other high resolution sensor being electrically coupled to the control circuit, the control circuit being further configured to:
   receive and count one or more other high-resolution transitions of the other high-resolution digital sensor in response to the rotating device rotating; and
   compare the low resolution transitions, the high resolution transitions, and the other high resolution transitions to determine a direction of rotation of the device.

10. The system of claim 8, where the high resolution sensor and the other high resolution sensor are in quadrature with each other.

11. The system of claim 8, where the rotating device is an electric motor and further comprises a rotor and one or more stator coils rotatively coupled to the rotor and electrically coupled to the control circuit, the control circuit being further configured to:
   send one or more electrical pulses through one or more of the stator coils of the electric motor; and
   determine an initial approximate angular position of the rotor of the electric motor in response to detecting timings of returning electrical pulses from the one or more stator coils, the timings of the returning electrical pulses being indicative of the angular position of the rotor.

12. The system of claim 11, the control circuit being further configured to determine a very accurate position of the rotor by detecting a pre-calibrated transition, the pre-calibrated transition being one of the transitions, the pre-calibrated transition having been pre-calibrated to the very accurate position.

13. The system of claim 12, where the electric motor comprises additional rotor magnets.

14. The system of claim 8, the control circuit being further configured to determine a direction of rotation in response to determining a number of high-resolution transitions between pairs of low-resolution transitions.

15. An electric motor comprising:
   a rotor configured to produce a magnetic field;
   one or more stator coils rotatively coupled to the rotor;
   a high-resolution digital sensor positioned such that the high-resolution digital sensor senses rotation of the rotating device;
   a low-resolution digital sensor positioned such that the low-resolution digital sensor senses rotation of the rotating device;
   a control circuit electrically coupled to the digital sensor;
   the control circuit being configured to:
      receive and count high-resolution transitions from the high-resolution digital sensor in response to the electric motor rotating;
      receive low-resolution transitions from the low-resolution digital sensor in response to the electric motor rotating, the low-resolution transitions being unevenly spaced apart;
      determine an angular position of the rotating device in response to determining a number of high-resolution transitions between pairs of low-resolution transitions;
   wherein the rotating device rotates a first amount between a first low-resolution transition and a second low-resolution transition, and the rotating device rotates a second amount, which is different than the first amount, between the second low-resolution transition and a third low-resolution transition, wherein the first, second, and third low-resolution transitions occur consecutively.

16. The electric motor of claim 15, further comprising another high-resolution sensor, the other high resolution sensor being electrically coupled to the control circuit, the control circuit being further configured to:
   receive and count one or more other high-resolution transitions of the other high-resolution digital sensor in response to the electric motor rotating; and
   compare the low resolution transitions, the high resolution transitions, and the other high resolution transitions to determine a direction of rotation of the electric motor.

17. The electric motor of claim 15, where the high resolution sensor and the other high resolution sensor are in quadrature with each other.

18. The electric motor of claim 15, the control circuit being further configured to:
   send one or more electrical pulses through one or more of the stator coils of the electric motor; and
   determine an initial approximate angular position of the rotor of the electric motor in response to detecting timings of returning electrical pulses from the one or more stator coils, the timings of the returning electrical pulses being indicative of the angular position of the rotor.

19. The electric motor of claim 18, the control circuit being further configured to determine a very accurate position of the rotor by detecting a pre-calibrated transition, the pre-calibrated transition being one of the transitions, the pre-calibrated transition having been pre-calibrated to the very accurate position.

20. The electric motor of claim 19, where the electric motor comprises additional rotor magnets.

21. The electric motor of claim 15, the control circuit being further configured to determine a direction of rotation in response to determining a number of high resolution transitions between pairs of low-resolution transitions.

* * * * *